United States Patent Office 2,753,618
Patented July 10, 1956

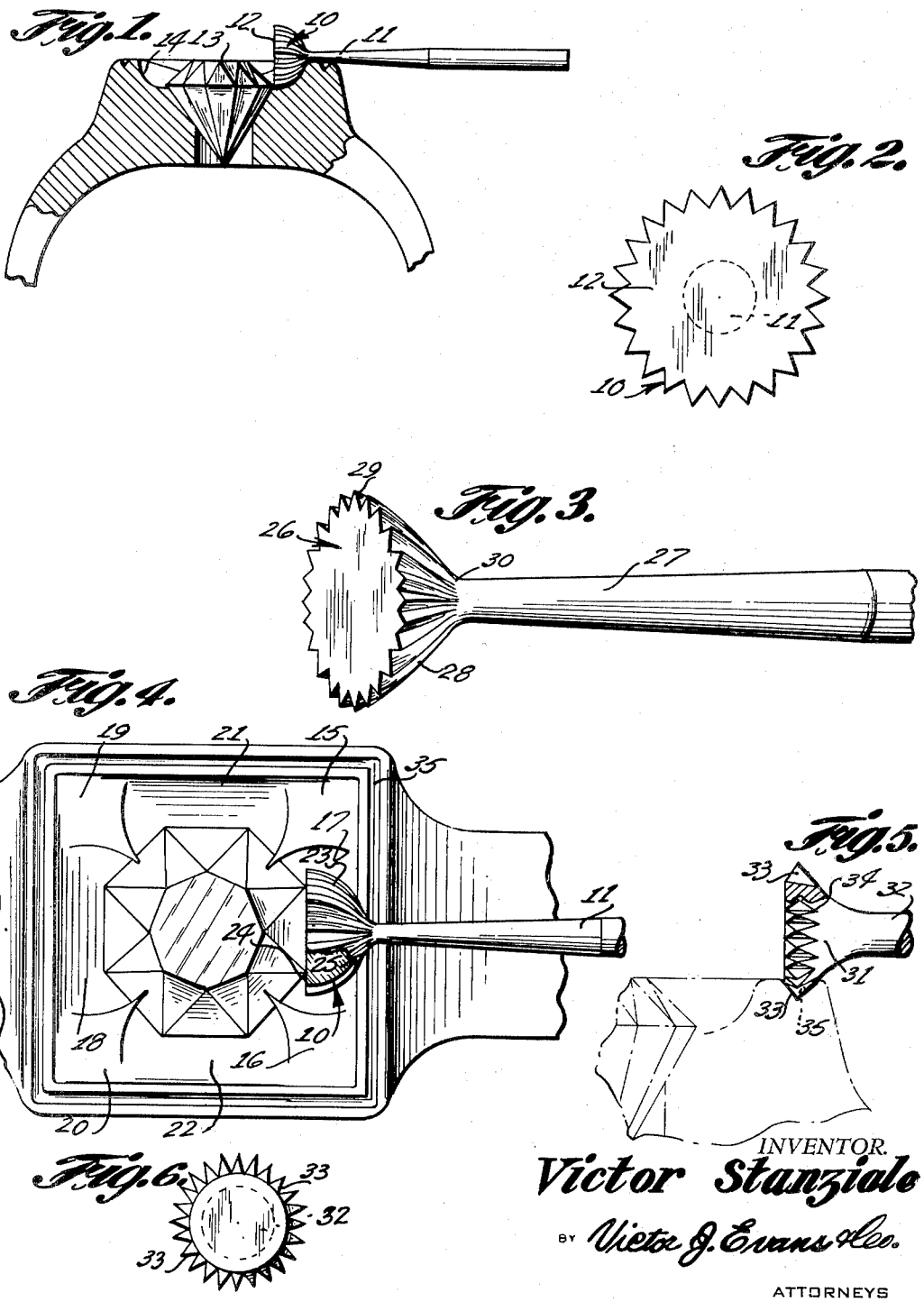

2,753,618
DIAMOND SETTER'S CUTTING TOOL

Victor Stanziale, Howard Beach, N. Y.

Application December 23, 1953, Serial No. 399,892

1 Claim. (Cl. 29—103)

This invention relates to cutting tools of the type used in a dental instrument handpiece, such as a burr, and in particular a cutter having a smooth face with cutting teeth in the back or rear surface between the stem and peripheral surface of the head whereby, with the smooth face positioned against an object, such as a diamond, material of a setting positioned around the diamond may be removed.

The purpose of this invention is to expedite the removal of surplus material, such as gold or platinum around a diamond setting without damaging the diamond and without damaging the holding elements of the setting.

With the conventional method of setting a diamond in a ring, brooch, watch case or the like, the stone is positioned with the table or top surface thereof flush with the exposed surface of the setting and with a stone set in this manner a portion thereof is covered with the material of the setting. With this thought in mind this invention contemplates a cutting tool carried by a stem or arbor in which the end surface, that is adapted to engage the surface of a stone in a setting, is uninterrupted or smooth and in which teeth are formed in the surface at the back of the head of a cutter extended from the periphery to the stem whereby with the cutter pressed into the material of a setting around a stone the end surface is adapted to travel against the stone without damaging the stone as the material is removed by the teeth of the rear surface thereof.

The object of this invention is, therefore, to provide a cutting tool for removing metal of a setting around the stone in which the stone is protected from cutting teeth of the cutter by a smooth end surface providing the face of the cutter.

Another object of the invention is to provide a cutter for removing material around a stone setting in which the cutter is adapted to be provided in various shapes and sizes to correspond with the size of a stone or setting associated therewith.

A further object of the invention is to provide an improved cutting tool for removing surplus material of a setting, particularly of precious stones in which the tool is of a simple and economical construction.

With these and other objects and advantages in view the invention embodies a stem or shank having a head with a smooth end surface or face on one end with a substantially convex rear surface and with cutting teeth provided in said rear surface.

Other features and advantages of the invention will appear from the following description taken in connection with the drawing, wherein:

Figure 1 is a longitudinal section through the setting of a ring, the lower part of the ring being broken away, illustrating a cutting tool in the position of removing material around a diamond of a diamond setting of a ring.

Figure 2 is an end elevational view of the cutting tool with the parts shown on an enlarged scale.

Figure 3 is a detail, also with the parts shown on an enlarged scale, showing cutting teeth of a different design.

Figure 4 is a plan view of the ring shown in Figure 1, also with the parts shown on an enlarged scale, illustrating the method of removing material at the sides and ends of a diamond with the tool adapted to leave formations at the corners providing gripping points whereby the stone is retained in position in the setting by points extended from the corners of the setting.

Figure 5 is a side elevational view of a cutter of a different design, with parts broken away showing the cutting teeth thereof, the cutter also illustrating a modification wherein means is provided for cutting a peripheral groove around the setting, such as the setting shown in Figure 4.

Figure 6 is an end elevational view of the cutter shown in Figure 5.

Referring now to the drawing wherein like reference characters denote corresponding parts the improved diamond setters cutting tool of this invention includes a head 10 having a stem 11 extended from one side and having a smooth cutting face 12 on the opposite side.

In use the smooth cutting face 12 is positioned to engage a stone, such as a diamond 13 whereby by moving the head 10 along the different sides or around a stone material is cut from a recess 14, as shown in Figure 1. In this operation the head 10 of the cutter is worked between points 15 and 16 at one side of the setting whereby material is removed from an area 17 between the points. By the same means the setting is turned around and material is removed from an area 18 between points 19 and 20 and also from areas 21 and 22 between the points 19 and 15 and 20 and 16, respectively. By this means the upper surface of the diamond or other stone is completely clear and vision thereof is unobstructed except for the points 15, 16, 19 and 20.

As illustrated in Figure 4 the back or rear surface of the head 10 is provided with cutting teeth 23 which extend from a point 24 at the periphery of the head to a point 25 at the intersection of the head and stem or shank 11. The face 12, which is positioned to engage a stone, such as the stone 13 is smooth whereby a stone engaged by the rotating cutter head 10 is not scratched or damaged.

The design illustrated in Figure 3 is substantially the same as that shown in Figures 1 and 4 except that a head 26 on a stem 27 is provided with cutting teeth 28 that extend from a point 29 at the periphery of the head to a point 30 at the intersection of the head with the stem. By this means grooves of different shapes and sizes may readily be cut in a setting around the stone. The cutting tools may be provided in a set with the sizes ranging from comparatively small burrs to larger cutting tools and the rear surface may be arcuate as shown in Figures 1 and 4 or straight as shown in Figure 3, as may be desired.

In the design shown in Figure 5 a cutting head 31 on a shank 32 is provided with cutting teeth 33 on the face and 34 at the back whereby a V-shape cutting edge is provided for forming a groove 35 between the areas 17, 18, 21 and 22 and the peripheral surfaces of the setting.

The cutting tools may be provided with coarse teeth for rapidly removing material and these cutters leave a comparatively rough or unfinished surface. However, the cutters may be provided with comparatively small teeth to provide a smooth finished surface.

It will be understood that modifications, within the scope of the appended claim, may be made in the design and arrangement of the parts without departing from the spirit of the invention.

What is claimed is:

A tool for use in cutting a diamond setting adjacent a diamond, comprising a head having a flat smooth circular end surface adapted to be positioned against the diamond, a stem extending from said head, said flat end surface lying in a plane perpendicular to the longitudinal axis of said stem, said head having an arcuate convex shape and including a rim portion, and a plurality of spaced apart cutting teeth extending from the rim portion of said head, the outer edges of said teeth being sharpened, said teeth having a V-shape and said teeth sloping backwards from the smooth circular end surface of the head so that the front of the tool will cause no cutting action.

References Cited in the file of this patent

UNITED STATES PATENTS

| | | |
|---|---|---|
| 703,063 | Hawkins | June 24, 1902 |
| 980,060 | Buser | Dec. 17, 1910 |
| 1,327,101 | Kellogg | Jan. 6, 1920 |
| 2,334,755 | Eglinton | Nov. 23, 1943 |